Figures 1, 2:
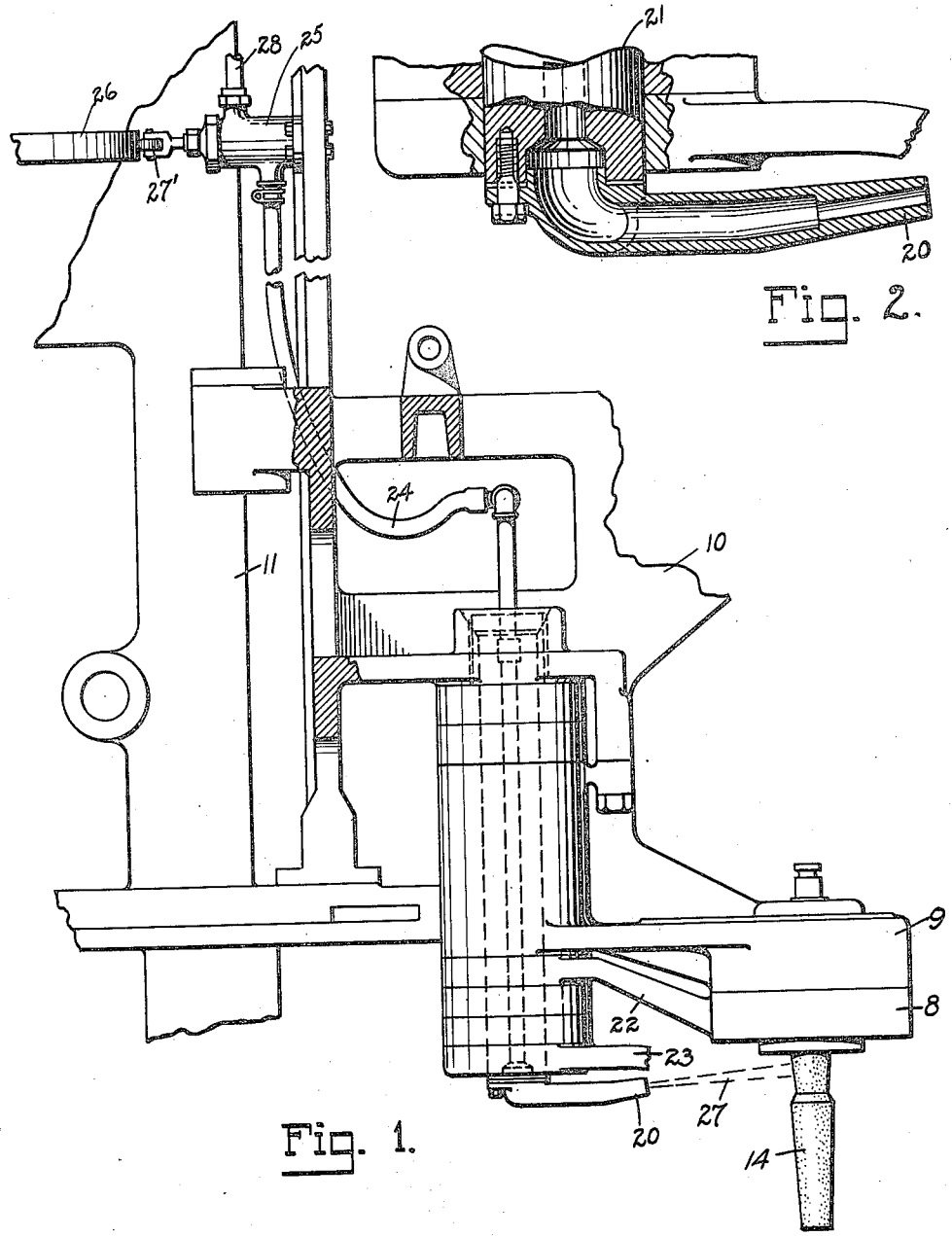

R. LA FRANCE.
GLASS FORMING MACHINE.
APPLICATION FILED NOV. 20, 1916.

1,299,482.

Patented Apr. 8, 1919.
2 SHEETS—SHEET 1.

INVENTOR.
Richard La France,
By J. F. Rule,
His attorney.

R. LA FRANCE.
GLASS FORMING MACHINE.
APPLICATION FILED NOV. 20, 1916.
1,299,482.
Patented Apr. 8, 1919.
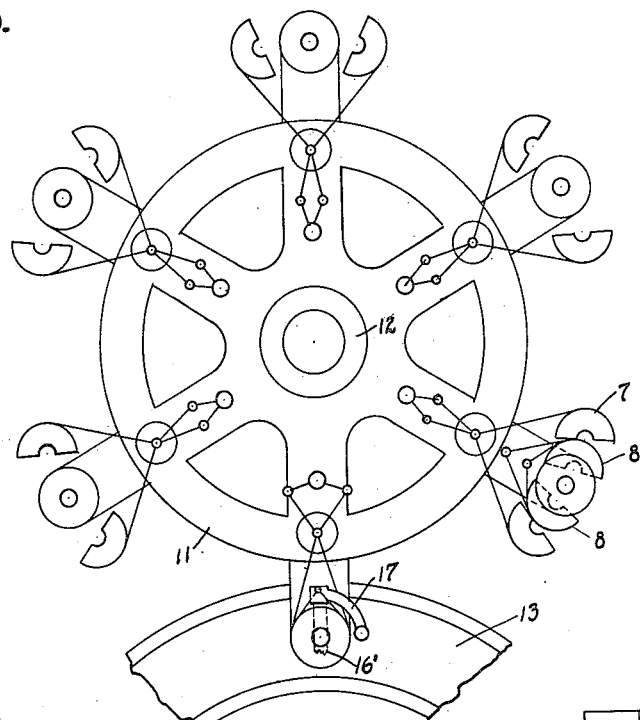
Fig. 3.
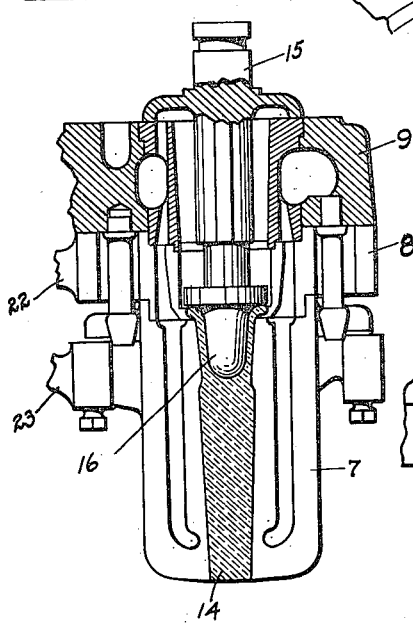
Fig. 4.
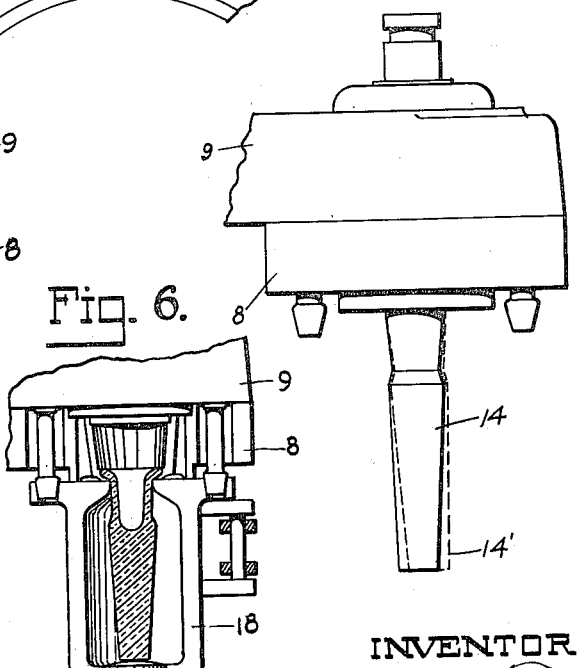
Fig. 5.
Fig. 6.
INVENTOR.
Richard La France,
By J. F. Rule.
His attorney.

UNITED STATES PATENT OFFICE.

RICHARD LA FRANCE, OF TOLEDO, OHIO, ASSIGNOR TO THE OWENS BOTTLE MACHINE COMPANY, OF TOLEDO, OHIO, A CORPORATION OF OHIO.

GLASS-FORMING MACHINE.

1,299,482.   Specification of Letters Patent.   Patented Apr. 8, 1919.

Application filed November 20, 1916. Serial No. 132,243.

*To all whom it may concern:*

Be it known that I, RICHARD LA FRANCE, a citizen of the United States, residing at Toledo, in the county of Lucas and State of Ohio, have invented new and useful Improvements in Glass-Forming Machines, of which the following is a specification.

My invention relates to machines for manufacturing glassware, and particularly to the type of machine in which the molten glass is collected, as by means of suction, in a blank mold, and transferred while still plastic to a finishing mold, where it is blown or otherwise manipulated to shape the blank into a bottle or other article.

In machines of this type, it is customary to provide a number of sets of molds, supported on a continuously rotating carriage, each set comprising a blank forming mold and a finishing mold. The blank forming mold consists of a sectional body mold and a sectional neck mold. After the molten glass has been introduced into the forming mold to produce a blank, the sections of the body mold are separated, leaving the blank suspended from the neck mold while being transferred to the blow mold and therein blown to its final shape. After the body mold has been opened, a bottom plate is brought up to engage the lower end of the suspended blank and support it until it has been blown, said plate serving as the bottom of the blow mold and forming the bottom surface of the bottle.

Between the time that the body mold is opened and the time that the bottom plate engages the blank, there is a tendency for the suspended blank to swing to one side, or away from a truly vertical position, thereby causing the blank to strike the bottom plate off center, thus making a bottle having a bottom thicker at one side than at the other. This difficulty is encountered particularly in making small-mouth ware, in which the tendency is usually for the blank to swing outwardly. This action may be accounted for by the unequal cooling of opposite surfaces of the soft, plastic blank. The surface of the blank farthest from the center of the machine, owing to its more exposed position, or from other causes, is cooled more rapidly than the inner surface. The outer side of the blank being thus hardened tends to hold its shape, while the inner side, being comparatively soft, tends to sag and swing the lower end of the blank outwardly.

An object of the present invention is to provide means to overcome this objection, and for this purpose I provide means for cooling or chilling the side of the suspended blank toward the center of the machine. The outward swinging tendency is thus counteracted and the blank held true.

In practising the invention, I provide a nozzle from which a blast of air is directed against the inner surface of the suspended blank, preferably directly under the neck mold. The blast of air is preferably intermittent, being controlled and timed by a cam actuated valve which cuts off the air supply, except during the intervals it is required to accomplish its purpose.

Other features and advantages will appear hereinafter.

In the accompanying drawings which illustrate a construction embodying the principles of my invention; Figure 1 is a fragmentary elevation showing a dipping-head and the carrier frame on which it is mounted, a blank being shown suspended from the neck mold. Fig. 2 is a sectional view of the nozzle; Fig. 3 is a diagrammatic plan of the molds and the rotary carrier on which they are mounted. Fig. 4 is a part-sectional elevation showing a blank mold and carrying head; Fig. 5 is an elevation showing a blank suspended from a neck mold; Fig. 6 is a sectional elevation of a blowing mold with a blank therein.

The invention is herein shown as applied to a machine of the type illustrated in my Patent Number 1,185,687, June 6, 1916. In machines of this type a number of mechanisms or units are supported on a carrying frame mounted to rotate about a central standard or pillar. Said mechanisms may all be alike and each comprises a set of molds including a blank mold and a blowing mold; the blank mold may, in turn, comprise a sectional body mold 7 and a sectional neck mold 8 supported beneath a blowing head 9. Each blank mold may be carried on a dipping-head 10 adapted to be moved up and down on the rotary carrying frame 11. During the operation of the machine, said frame rotates continuously about the central standard 12 so that the blank molds are brought seriatim over the glass tank 13 containing molten glass. Each blank mold as it travels over the tank is lowered by suitable mechanism (not shown) to bring the mold into contact with the molten glass, and the air withdrawn from the mold, so that a charge of glass is drawn into the mold cavity to produce a blank 14.

A plunger 15 provided at its lower end with a pin or core 16, is lowered by suitable mechanism to project the core into the mold cavity and thereby form in the blank an initial blow opening. After the charge has been drawn into the mold, a knife 16', Fig. 3, carried by a reciprocating arm 17, is swung across the bottom of the mold to separate the glass in the mold from that in the tank.

When the blank mold passes beyond the tank, the blank sections 7 are separated, leaving the blank 14 suspended from the neck mold 8 as shown in Fig. 5. A blowing mold 18 is then brought upward between the blank mold sections and closed around the blank (Fig. 6), the blank being then blown to form the bottle.

A bottom 19, Fig. 6, is movable upward into position to engage the bottom of the blank and provide a support therefor, said bottom perferably forming a closure for the lower end of the blowing mold and giving shape to the bottom of the bottle. The blowing mold and the bottom 19 may be constructed and operated as shown, for example, in the patent to Bock, 870,664.

The blank 14 while suspended from the neck mold 8, is in a soft, plastic condition so that the more rapid cooling of its outer surface as before noted, unless counteracted, is effective to swing the lower end of the blank outwardly, as indicated by broken lines at 14'. As a result, the blank will be off center in the blowing mold so that when the blank is blown, the thickness of the walls of the bottle will not be uniform. Also the blank when thus thrown out of the vertical, does not rest centrally or squarely on the bottom 19. This results in the bottom of the bottle being of unequal thickness and unsymmetrical.

In order to counteract the tendency of the blank to swing outwardly, means is provided for cooling the inner surface of the blank, that is, the surface nearest the center of the machine to thereby overcome or counterbalance the tendency for the blank to be thrown outwardly from its normal vertical position, so that the blank remains vertical.

The cooling means, as herein shown, comprises a nozzle 20, through which a current of air is directed against the inner surface of the blank, preferably near the upper end thereof. The nozzle 20, as shown, is attached to the lower end of a tubular pivot rod 21, on which are mounted the swinging arms 22 carrying the neck mold sections 8, and the arms 23 carrying the blank mold sections.

The air passage through the nozzle registers with the opening in the hollow rod 21 which communicates through a flexible tube 24, valve 25 and tube 28, with a suitable source of compressed air. The blast of air 27 is preferably intermittent, being supplied only while a blank is suspended from the neck mold. This supply is controlled by the valve 25 actuated by a cam 26, on which runs a roller 27' carried by the valve stem. It will be understood that the valve 25 being mounted on the carriage 11 travels along the stationary cam 26, the latter being formed to open the valve at the required intervals.

Although I have shown the invention applied to the type of machine well known as the Owens bottle machine, it is to be understood that it may be used with other types of machines, and, in general, wherever it is desirable to control the position of a suspended blank, parison, or mass of glass in a plastic condition, by a differential variation in the temperatures at different portions of its surface.

It is to be further understood that the relative temperature of different portions of the blank surface may be varied for the purpose of controlling the position of the blank by other means than those specifically set forth herein. Other variations may be resorted to within the spirit and scope of the invention.

What I claim is:

1. In glass forming mechanism, the combination of means to suspend a charge of glass while in a plastic state, and means to control its position by reducing the temperature of one side thereof.

2. In glass forming mechanism, the combination of means to suspend a charge of glass while in a plastic state, and means to direct a cooling blast on one side of the suspended glass.

3. In glass forming mechanism, the combination of means to suspend a charge of glass while in a plastic state, and means to control its position by producing a difference in the temperature of opposite sides of the suspended charge.

4. In a glass forming machine, the combination with means for forming a blank, of means for suspending said blank and transferring it while in a soft or plastic condition to a finishing mold, and means for cooling one side of the blank by directing a cooling blast thereagainst while thus suspended.

5. In a glass forming machine, the combination with means for forming a blank, of means for suspending said blank and transferring it while in a soft or plastic condition to a finishing mold, and means for cooling one side of the blank while thus suspended, said cooling means comprising a nozzle by which an air blast is directed against the blank adjacent to its point of suspension.

6. In a glass forming machine, the combination with a rotary carrier, of means thereon for gathering glass at predetermined intervals during the rotation of the carrier, and suspending said glass in a plastic condition, and automatic means for intermittently supplying a blast and directing it against the side of the suspended glass.

7. In a glass forming machine, the combination of a frame rotatable about a vertical axis, a blank forming mold carried by said frame in which glass is collected and formed into a blank, means for opening said mold and suspending the blank while in a soft or plastic condition, a finishing mold to which the blank is transferred while the said frame is rotating, and means for cooling the side of the blank nearest the center of rotation to thereby control its position.

8. In a glass forming machine, the combination of a frame rotatable about a vertical axis, a blank forming mold carried by said frame in which glass is collected and formed into a blank, means for opening said mold and suspending the blank while in a soft or plastic condition, and means for directing a blast of air against the inner surface of the blank while thus suspended.

9. In a glass forming machine, the combination of means for forming a blank, means for suspending the blank and transferring it to a finishing mold, and means to counteract a tendency of the blank to swing comprising a device for cooling one side of the blank while thus suspended.

10. In a glass forming machine, the combination of means for forming a blank, means for suspending the blank and transferring it to a finishing mold, and means for directing a blast of air against one side of the blank while thus suspended.

11. In a glass forming machine, the combination with a blank mold and a finishing mold, of a rotary carrier on which said molds are supported, means for suspending a blank formed in the blank mold, and transferring it to the finishing mold while said carrier is rotating, and means to direct a blast of air against the surface of the blank nearest the center of rotation of the carrier while being thus transferred and thereby chilling said surface.

12. In a glass forming machine, the combination of a carrier rotatable about a vertical axis, a blank forming mold carried thereby and comprising a sectional body blank mold and a sectional neck mold, means to bring said mold during the rotation of said carrier into contact with molten glass and charge the mold therewith to form a blank, means for opening the body mold sections leaving the blank suspended from the neck mold, means for transferring the blank while thus suspended to the finishing mold, and means for directing a blast of air against the exterior surface of the suspended blank facing said axis.

13. In a glass forming machine, the combination with a blank mold and a finishing mold, of means for opening the blank mold and transferring the blank to the finishing mold, comprising a support from which the blank depends while being transferred, a bottom arranged to engage the lower end of the blank after the blank mold has been opened and thereby support the blank, and means for directing a cooling blast against an exterior surface of the blank while being transferred from the blank mold and thereby controlling the position of the blank.

14. In a glass forming machine, the combination with a rotary supporting frame, of a blank mold carried thereby comprising a body portion and a neck mold portion, a finishing mold, means for opening the body blank mold and transferring the blank while suspended from the neck mold to the finishing mold, a bottom arranged to engage the lower end of the suspended blank after the body mold is opened, and thereby support the blank, said blank rotating with said frame while thus suspended, and the means for cooling the side of the blank nearest the axis of rotation, thereby counteracting the tendency of the blank to be swung outwardly.

15. In glass forming mechanism, the combination of means to suspend a charge of plastic glass, and means to direct a blast against one side of the charge while thus suspended.

16. The combination of means for supporting a mass of plastic glass with the glass projecting from its support, and local means for varying the temperature of one side of the projecting glass and thereby controlling its position relative to said support.

17. In a glass forming machine, the combination of means for forming a blank, means to support and transfer the bare blank while in a soft and plastic condition to a finishing mold, and means to control the position of the blank relative to its support by directing a blast against a surface of the bare blank.

In testimony whereof I have affixed my signature this 16th day of November, 1916.

RICHARD LA FRANCE.